(No Model.)

J. E. LOUGHRIDGE.
BRAKE MECHANISM FOR RAILWAY CARS.

No. 495,255. Patented Apr. 11, 1893.

Witnesses:
A. V. Groups
R. Schleicher

Inventor:
Jacob E. Loughridge
by his Attorneys
Howson & Howson

UNITED STATES PATENT OFFICE.

JACOB E. LOUGHRIDGE, OF PHILADELPHIA, PENNSYLVANIA, ASSIGNOR TO THE LOUGHRIDGE BRAKE AND CAR COMPANY, OF CAMDEN, NEW JERSEY.

BRAKE MECHANISM FOR RAILWAY-CARS.

SPECIFICATION forming part of Letters Patent No. 495,255, dated April 11, 1893.

Application filed February 10, 1893. Serial No. 461,746. (No model.)

*To all whom it may concern:*

Be it known that I, JACOB E. LOUGHRIDGE, a citizen of the United States, and a resident of Philadelphia, Pennsylvania, have invented certain Improvements in Braking Mechanism for Railway-Cars, of which the following is a specification.

My invention consists of certain improvements in railroad car brake mechanism of the character set forth in various patents heretofore granted to me, among which I may note the following:—No. 433,294, dated July 29, 1890, and Nos. 484,597 and 484,598 dated October 18, 1892. The devices described in the said patents have for their object the retention of the fulcrum of one of the levers of the braking mechanism, preferably the "dead" lever, in the successive positions of advancement which it assumes by reason of the wear of the brake shoes or looseness or slack of the brake gear, and the object of my present invention is to combine with braking mechanism of this class a device whereby the movement of the fulcrum of the compensating lever is rendered more positive than before, or must, of necessity, take place on every release of the brakes, provided, of course, that there is, at such time, undue slack in the braking mechanism which must be compensated for by the movement of the lever, so that no reliance is placed upon the shaking movement of the lever to insure the taking up of the slack nor is there any necessity for moving said lever by hand for such purpose.

In the accompanying drawings I have illustrated my invention as applied to brake gear of the character shown in my patent No. 484,598, but it should be understood that it is not limited thereto.

Figure 1:
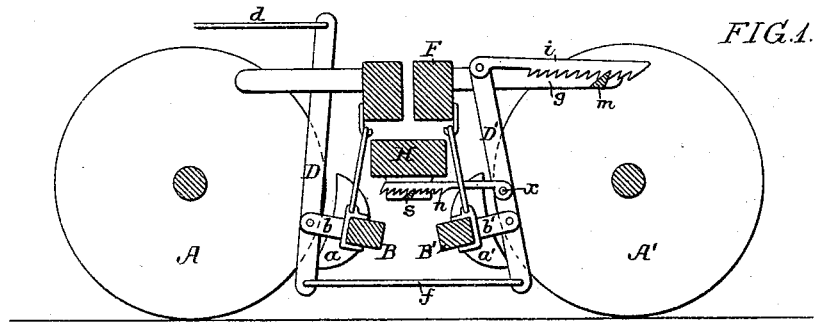
Figure 2:
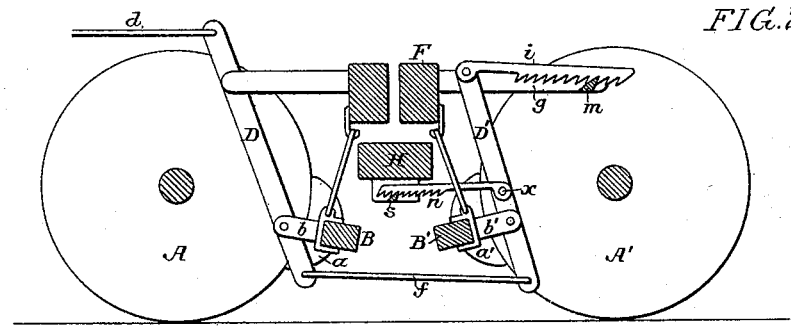
Figure 3:
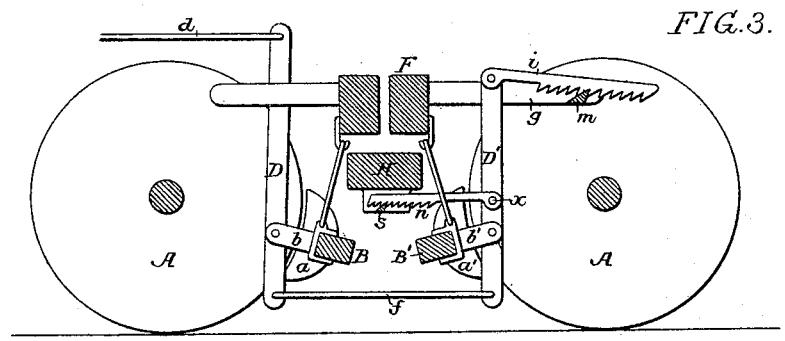

Figure 1, is a diagram illustrating the application of the invention to an inside brake gear. Figs. 2 and 3, are similar views, but showing the gear in different positions and illustrating the purpose of my invention; and Fig. 4, is a diagram illustrating the invention as applied to an outside brake gear.

In both forms of brake gear which I have shown A A' represent the two wheels at one side of the truck, and B B' the two brake beams suspended from the truck as usual and carrying the brake shoes a a' respectively, the shoe a acting on the wheel A, and the shoe a' acting on the wheel A'. Hung to a bracket b on the brake beam B is what is known as the "live" lever D of the brake gear, the long arm of this lever being connected, by a rod d, to the brake operating device, which may be either hand or power actuated, the short arm of the lever being connected, by a rod f, to the short arm of a lever D' which is known as the "dead" lever and is hung to a bracket b' on the brake beam B', the upper end of said dead lever being guided in a slotted arm or bracket g, which, in the case of the truck shown in Fig. 1, is secured to and projects from the bolster F, and in the case of the truck shown in Fig. 4, is carried by one of the sills G of the truck, but which may be supported in any suitable manner. The upper end or fulcrum end of the dead lever carries a pivoted rack i which has undercut teeth adapted to engage with a pawl tooth m on the slotted arm or bracket g so that any outward movement of said end of the dead lever will be held by reason of the engagement of said rack and pawl tooth, all as fully set forth in my patent No. 484,598, before alluded to. In the present instance, however, the lever D' carries another rack bar n which engages with a catch, tooth, lug, or other projection s on the spring bolster H or in the case of a metallic bolster, the tooth or catch may form part of the bolster itself, the latter being cut away for the passage of the rack bar.

Supposing that the brake shoes are hanging at more than their normal distance away from the wheels, as shown in Fig. 1, the operation of the device will be as follows: When the brake rod is pulled so as to throw the brake shoes toward or against the wheels the rack n will follow the movement of the lever D' and will be held in its advanced position by engagement with the tooth or catch s on the bolster H. When the brakes are released, and the shoe a' falls or is drawn away from the wheel, the pivot pin x of the rack n, being incapable of movement in this direction, serves as a fulcrum for the lever D' and causes the upper end of the latter to move outward in the direction of the arrow Fig. 3 so as to advance the rack i, and hold the upper end of the lever in the advanced position, the brake shoes then occupying their normal relation to the wheels, and there will be no further change in the position of the rack n until there is sufficient slack or wear to permit another tooth of the same to engage with the catch s when the brakes are applied. If the amount of lost motion in the first instance is excessive, one operation of the brake cylinder may not be sufficient to bring the shoes against the wheels, but whatever the movement of the shoe a' may be, there will be a movement of the rack n, and this movement will be held so that when the shoes fall or are drawn back on the release of the brakes there will be a forward movement of the take-up rack i and on the next operation of the brake cylinder there will be a further forward movement of the rack n and, on the release of the brakes, a further movement of the take-up rack i, hence any amount of lost motion that there may be in the first instance can be effectually taken up and the brake shoes caused to assume their proper normal relation to the wheels which they will maintain until they are worn out.

Figure 4:
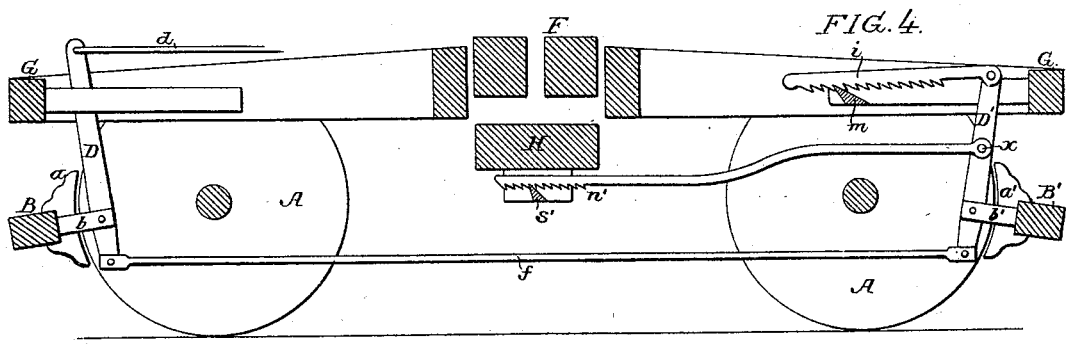

In the construction shown in Fig. 4 the rack n' has teeth the reverse of those of the rack n shown in Figs. 1, 2 and 3, for in this case the movement which is to be held is a movement toward the bolster or center of the truck, instead of a movement away from the bolster, as in Figs. 1, 2 and 3.

Although I prefer in carrying out my invention to utilize the dead lever in all cases, as the compensating lever, some other lever of the brake gear may in some cases answer the purpose, and although it is preferable to employ in connection with such compensating lever a rack n engaging with a fixed tooth or catch, it will be evident that the reverse construction may be adopted, that is to say, the bar n may have a tooth engaging with a fixed rack, as in the alternative constructions described in my former patents, or the successive positions of advancement of the compensating lever in either direction may be held by a movable wedge, as in my patent No. 432,294, it being advisable in all cases that the means employed shall be automatic in their action.

Having thus described my invention, I claim and desire to secure by Letters Patent—

1. The combination, in braking mechanism for railway cars, of a lever movable to compensate for lost motion caused by wear or slack of the brake gear, with two fulcrums, one movable in one direction and serving as the fulcrum for one movement of the lever, and the other movable in the opposite direction and serving as the fulcrum for the other movement of the lever, substantially as specified.

2. The combination of the dead lever of railway car brake mechanism, with two fulcrums, one movable in one direction and the other in the opposite direction, and one serving as the fulcrum when the brake shoes move toward the wheels, and the other serving as the fulcrum when the brake shoes move away from the wheels, substantially as specified.

3. The combination of the compensating lever of railway car brake mechanism, with two fulcrums, one movable in one direction and the other in the opposite direction, and one serving as a fulcrum when the brake shoes are moved toward the wheels, and the other serving as a fulcrum when the brake shoes are moved from the wheels, and means for automatically retaining each of said fulcrums in the successive positions of advancement which it assumes, substantially as specified.

4. The combination of the compensating lever of railway car brake mechanism, with two fulcrums for the said lever, one of these fulcrums being movable in one direction and the other in the opposite direction, and with rack and pawl mechanism for retaining each of said fulcrums in its successive positions of advancement, substantially as specified.

In testimony whereof I have signed my name to this specification in the presence of two subscribing witnesses.

JACOB E. LOUGHRIDGE.

Witnesses:
JOSEPH H. KLEIN,
HARRY SMITH.